US010610037B1

United States Patent
deLoache, III et al.

(10) Patent No.: US 10,610,037 B1
(45) Date of Patent: Apr. 7, 2020

(54) HOOK WITH LIGATURE-RESISTANCE FOR SUSPENDING PERSONAL ITEMS FROM A WALL OR DOOR

(71) Applicant: BEHAVIORAL SAFETY PRODUCTS, LLC, Watkinsville, GA (US)

(72) Inventors: Robert Lee deLoache, III, Watkinsville, GA (US); David Cory deLoache, Watkinsville, GA (US); Mark Mendes, Loganville, GA (US)

(73) Assignee: BEHAVIORAL SAFETY PRODUCTS, LLC, Watkinsville, GA (US)

( * ) Notice: Subject to any disclaimer, the term of this patent is extended or adjusted under 35 U.S.C. 154(b) by 0 days.

(21) Appl. No.: 16/189,394

(22) Filed: Nov. 13, 2018

(51) Int. Cl.
 *A47G 25/06* (2006.01)
 *F16B 45/00* (2006.01)
 (Continued)

(52) U.S. Cl.
 CPC ............ *A47G 25/0642* (2013.01); *A47G 1/20* (2013.01); *A47K 10/12* (2013.01); *F16B 45/00* (2013.01)

(58) Field of Classification Search
 CPC .... A47G 25/064; A47G 25/0642; A47G 1/20; A47G 25/065; A47G 25/0607;
 (Continued)

(56) References Cited

U.S. PATENT DOCUMENTS 3,424,418 A   1/1969 Freedman et al.
3,957,241 A   5/1976 Morris et al.
(Continued)

FOREIGN PATENT DOCUMENTS

GB        2504710 B      9/2014
IN    201641041424 A     6/2018

OTHER PUBLICATIONS

BobBarker, "Lifeline Safety Hook", downloaded from https://www.bobbarker.com/lifeline-antisuicide-hook.html on Aug. 8, 2018, 2 pages. (pp. 1-2 in pdf).
(Continued)

*Primary Examiner* — Christopher Garft
(74) *Attorney, Agent, or Firm* — Mitch Harris, Atty at Law; Andrew M. Harris

(57) ABSTRACT

A ligature-resistant wall hook for coats, towels, or other personal items, provides ligature-proof operation by rotation of a hook tab when the applied weight is over a threshold weight and by other included features. A baseplate having a planar rear surface is mounted to a wall or door and has a rotating tab attached for receiving and retaining the personal article. A restoring-force-providing member restores the rotating tab to an upward position. The ligature-resistant wall-mountable hook also include a cover for covering the baseplate and having an aperture through which the extension projects. An exterior profile of the cover above the aperture at each side of the aperture extends outward from the baseplate and downward at an angle exceeding 30 degrees from the perpendicular direction, so that a loop formed around the rotating tab and the cover and pulled downward is drawn outward to contact the rotating tab.

18 Claims, 6 Drawing Sheets

(51) Int. Cl.
*A47K 10/12* (2006.01)
*A47G 1/20* (2006.01)

(58) Field of Classification Search
CPC ....... A47G 29/083; A47K 10/12; F16B 45/00; F16B 45/02; F16B 45/025; F16B 45/04; A47F 5/0006; B60R 7/10; F16M 11/10
See application file for complete search history.

(56) References Cited

U.S. PATENT DOCUMENTS

| | | | | |
|---|---|---|---|---|
| 4,221,354 | A * | 9/1980 | Kempkers | A47G 25/065 248/291.1 |
| 4,537,434 | A * | 8/1985 | Piercy | B66C 1/38 294/82.31 |
| 8,584,494 | B2 | 11/2013 | Salvatore et al. | |
| D731,291 | S | 6/2015 | Boeltl | |
| D736,061 | S | 8/2015 | Boeltl | |
| 9,297,154 | B2 | 3/2016 | deLoache, III et al. | |
| 9,301,658 | B1 | 4/2016 | Boeltl | |
| D792,955 | S | 7/2017 | deLoache, III | |
| 9,938,704 | B2 | 4/2018 | deLoache, III | |
| 2006/0071137 | A1 * | 4/2006 | Livingstone | A47G 25/0642 248/308 |
| 2010/0320345 | A1 * | 12/2010 | Huang | A47G 25/0635 248/308 |
| 2011/0035910 | A1 * | 2/2011 | Wu | F16M 11/10 24/303 |
| 2018/0135286 | A1 | 5/2018 | deLoache, III | |
| 2018/0208122 | A1 * | 7/2018 | Mozurkewich | B60R 7/10 |

OTHER PUBLICATIONS

Cape Cod Systems, "Single Hook Panel, CCSW1830-SLPT", downloaded from https://www.capecodsystemscompany.com/store/-ccsw1830-slpt.product.asp on Aug. 8, 2018, 4 pages (pp. 1-4 in pdf).
Whitehall Manufacturing, "Ligature Resistant Adjustable Auto-Release Clothes Hook", downloaded from https://www.whitehallmfg.com/product.aspx?productid=1019 on Oct. 22, 2018, 2 pages (pp. 1-2 in pdf).
U.S. Appl. No. 15/987,295, filed May 23, 2018, deLoache III, et al.
U.S. Appl. No. 16/001,450, filed Jun. 6, 2018, deLoache III, et al.
Cape Cod Systems, "Kingsway Anti Ligature Dual Coat Hook Rack, CCS_KG177", downloaded from https://www.capecodsystemscompany.com/store/ccs_kg177,Product.asp on Oct. 22, 2018, 4 pages (pp. 1-4 in pdf).
Cape Cod Systems, "ASi, Clothes Hook, Square—Chase Mount, CCS_ASi_122", downloaded from https://www.capecodsystemscompany.com/store/ccs_asi_122_squareclotheshook,Product.asp on Oct. 22, 2018, 4 pages (pp. 1-4 in pdf).
Cape Cod Systems, "ASi, Clothes Hook, Chase Mount, CCS_ASI_121_ClothesHook", downloaded from https://www.capecodsystemscompany.com/store/ccs_asi_121_clotheshook,Product.asp on Oct. 22, 2018, 4 pages (pp. 1-4 in pdf).
Cape Cod Systems, "A&J Washroom Security Hook for Chase Walls, CCSA18", downloaded from https://www.capecodsystemscompany.com/store/security-15-exposed-mount-hook,Product.asp on Oct. 22, 2018, 5 pages (pp. 1-5 in pdf).

* cited by examiner

HOOK WITH LIGATURE-RESISTANCE FOR SUSPENDING PERSONAL ITEMS FROM A WALL OR DOOR

BACKGROUND OF THE INVENTION

1. Field of the Invention

The present invention relates generally to hooks for suspending personal items on doors or walls, and in particular, to a hook which releases a ligature.

2. Description of the Related Art

Ligature-resistant design is a requirement in many institutional locations. In particular, in rooms where persons may be left unattended and where there is a risk that fixtures may be used as a support to tie a ligature, such as a belt, rope or a cloth, a way to ensure that the fixtures cannot be used in such a manner is desirable. In general, ligature-resistant design is an issue that exists any height above the floor, since objects above the floor can be used to support a ligature, even if one is not attachable.

Typical wall-mountable hooks such as coat hooks cannot be used in an environment where ligature support is a hazard, since such hooks are typically designed to support a substantial amount of weight above a floor. Flexible hooks made from bendable rubber or plastic have been used in such environments, but eventually will lose flexibility and may still support a ligature if flexibility is lost, or the mounting portion is penetrated by removing the flexible portion or inserting a ligature between the flexible portion and the mounting base.

Therefore, it would be desirable to provide a wall-mountable hook that prevents ligature formation and/or support of such ligatures.

SUMMARY OF THE INVENTION

The above objectives, among others, are achieved in a ligature-resistant wall-mountable hook and a method of supporting personal objects from a door or wall with a ligature-resistant wall-mountable hook.

The ligature-resistant wall-mountable hook includes a baseplate having a planar rear surface for attachment to the wall or door and a rotating tab coupled to the baseplate for receiving and retaining the personal article. The ligature-resistant wall-mountable hook also includes a restoring-force-providing member for restoring the rotating tab to an upward position. In the upward position, an extension of the tab away from the baseplate extends upward along a direction at least 30 degrees from a direction perpendicular to the planar rear surface of the baseplate, so that a loop formed around the extension of the rotating tab is held by the extension of the tab unless the weight applied to the loop exceeds a threshold weight dependent on a spring constant of the spring. The ligature-resistant wall-mountable hook also includes a cover for covering the baseplate and having an aperture through which the extension projects. An exterior profile of the cover above the aperture at each side of the aperture extends outward from the baseplate and downward at an angle exceeding 30 degrees from the perpendicular direction, so that a loop formed around the rotating tab and the cover and pulled downward is drawn outward to contact the rotating tab, such that if a weight on the loop exceeds the threshold weight, the rotating tab rotates to release the loop.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present disclosure illustrates wall-mountable and door-mountable hooks that provide ligature-resistance and/or release a ligature supporting a weight above a threshold weight. The ligature-resistant hook includes a baseplate for attachment to the wall or door and a rotating tab for holding a personal article. The ligature-resistant wall-mountable hook also includes a restoring-force-providing member for restoring the rotating tab to an upward position. In the upward position, an extension of the tab away from the baseplate extends upward along a direction at least 30 degrees from a direction perpendicular to the planar rear surface of the baseplate, so that a loop formed around the extension of the rotating tab is held by the extension of the tab unless the weight applied to the loop exceeds a threshold weight dependent on a spring constant of the spring. The ligature-resistant wall-mountable hook also includes a cover for covering the baseplate and through which the extension projects. An exterior profile of the cover extends outward from the baseplate and downward at an angle exceeding 30 degrees from the perpendicular direction, so that a loop formed around the rotating tab and the cover and pulled downward is drawn outward to contact the rotating tab, such that if a weight on the loop exceeds the threshold weight, the rotating tab rotates to release the loop.

Figure 1A:
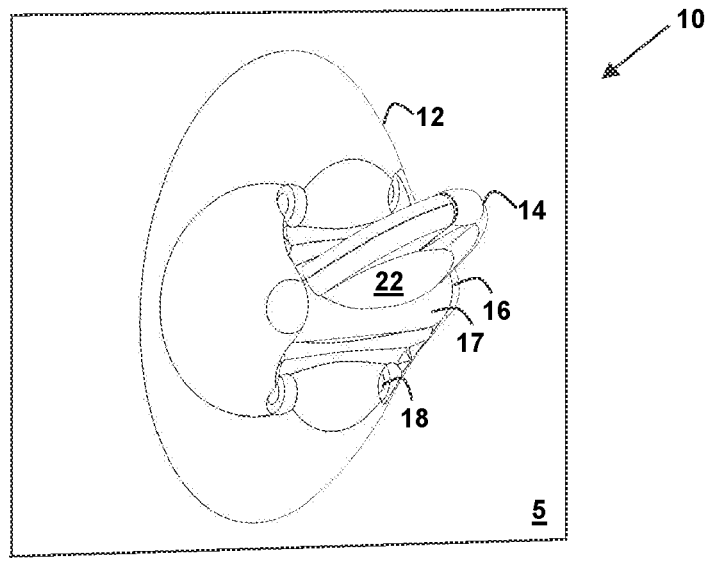
FIG. 1A is a perspective view of an installation of an example ligature-resistant wall-mountable hook 10.
Figure 1B:
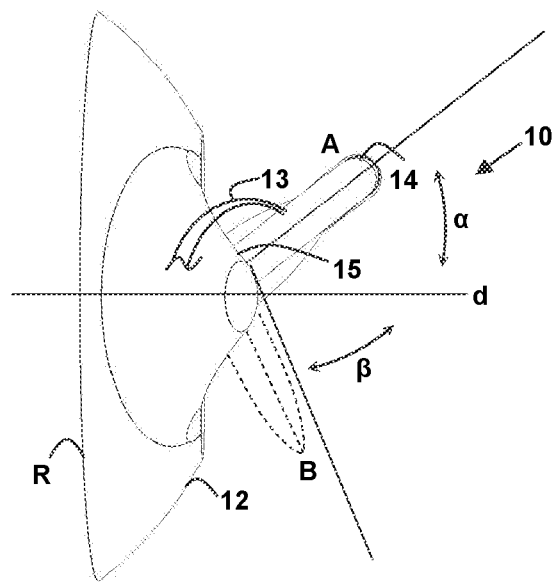
FIG. 1B is a side view of example ligature-resistant wall-mountable hook 10.

Referring now to FIG. 1A, a perspective view of an installation of an example ligature-resistant wall-mountable hook 10 is shown. A cover 12 provides the external shape of ligature-resistant wall-mountable hook 10 at the surface of a wall or door 5 to which ligature-resistant wall-mountable hook 10 is mounted by fasteners 18 such as wood or sheet metal screws, as appropriate. A rotating tab 14 is used to suspend personal articles, e.g., a coat or purse by looping a strap or collar of the personal article around rotating tab 14. Rotating tab 14 is held in an upward position, which in the example is directed upward at an angle α=45° from the horizontal, i.e., a direction d perpendicular to a planar rear mounting surface R of ligature-resistant wall-mountable hook 10, but can be any angle greater than 30° upward from direction d. Rotating tab 14 is held in the upward position by an internal restraining-force-providing member (not shown) and rotates via a cylindrical body portion 17 that is retained at each end by axle end supports 16. FIG. 1B shows a side view of ligature-resistant wall-mountable hook 10, with rotating tab 14 in an upward position A and with a downward position B illustrated in dashed lines. When a personal article is suspended, e.g., by a strap or loop 13 on rotating tab 14 that exceeds a threshold weight, rotating tab 14 rotates to downward position B, which in the example directs an extension 22 of rotating tab 14 downward at an angle β=60° from direction d perpendicular to planar rear mounting surface R of ligature-resistant wall-mountable hook 10, but can be any direction greater than 30° downward from direction d. Rotating rotating tab 14 downward releases strap 13 of the personal article. In general, ligature-resistant wall-mountable hook 10 is designed to support, i.e., rotating tab 14 will not rotate during suspension of, personal articles having a weight less than a threshold weight in a range of 5-15 lbs. In the example, rotating tab 14 is designed to release any article having a weight of greater than 7 lbs. Similarly, any attempt to form a ligature by placing loop 13 around rotating tab 14 will fail due to the rotation of rotating tab 14 when a weight greater than the threshold weight, e.g., 7 lbs. is applied to the ligature. The exterior profile of cover 12 is designed to further assist in preventing ligature formation by providing a sloped/curved surface 15 above rotating tab 14 at each end of rotating tab 14 that directs a loop outward, i.e., in a direction perpendicular to planar rear mounting surface R of ligature-resistant wall-mountable hook 10 when weight is applied.

Figure 2A:
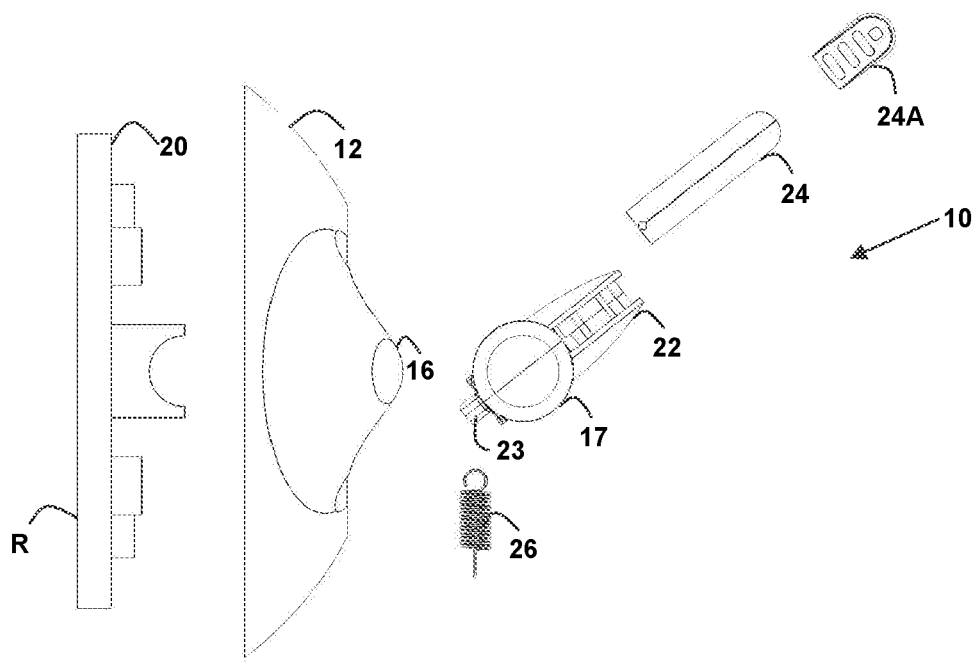
FIG. 2A and FIG. 2B are exploded views of the example ligature-resistant wall-mountable hook 10.
Figure 2B:
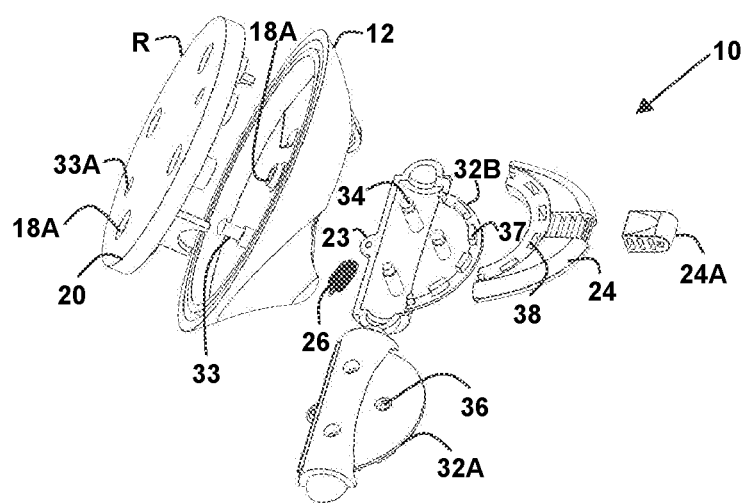

Referring now to FIG. 2A, an exploded view of ligature-resistant wall-mountable hook 10 is shown. A baseplate 20 provides planar rear mounting surface R of ligature-resistant wall-mountable hook 10. Cover 12 fits over baseplate 20, completely covering baseplate 20 and sealing ligature-resistant wall-mountable hook 10 against insertion of ligatures behind ligature-resistant wall-mountable hook 10. The exterior surface of cover 12 is curved to prevent support of ligatures around a perimeter of ligature-resistant wall-mountable hook 10, and as described above, provides sloped/curved surface 15, so that any ligature formation with any significant weight applied will slide onto rotating tab 14, and if the weight is above the threshold weight, rotating tab 14 will rotate to release the ligature. The threshold weight is determined in part by the spring constant of a spring 26 and by the dimensions of rotating tab 14, including a position of a flange 23 through which an end of spring 26 is inserted. The structure of rotating tab 14 is shown, which is formed by a lip 24 that has a parabolic or semi-circular external profile that has a midpoint at an apex at the maximum extension of rotating tab 14 from cover 12 and extends rearward toward cover 12 to axle end supports 16 at each end of cylindrical body portion 17 of rotating tab 14. A rubber grip 24A is mounted to the center of lip 24, to improve gripping of objects on rotating tab 14. FIG. 2B shows further details of the construction of rotating tab 14, which in the example is formed from two body portions: top portion 32A and bottom portion 32B. In the example, top portion 32A includes studded holes 36 that accept rivets 34 formed on an interior face of bottom portion 32B, and which are swaged to secure top portion 32A to bottom portion 32B when rotating tab 14 is assembled. Top portion 32A and bottom portion 32B are generally formed from cast metal and lip 24 is generally a molded plastic part. Bottom portion 32B includes protrusions 37 that secure lip 24 to rotating tab 14 after top portion 32A and bottom portion 32B are fastened together around lip 24, which has recesses 38 that receive protrusions 37. Top portion 32A also has protrusions (not shown) that extend into recesses 38, as will be illustrated in further detail below. Baseplate 20 includes through holes 18A and cover 12 includes mounting holes through which the mounting fasteners, e.g., wood screws or sheet metal screws are inserted. Rivets 33 are formed on a back interior surface of cover 12 to align and retain cover 12 to baseplate 20 once swaged through holes 33A, so that ligature-resistant wall-mountable hook 10 is provided as an integral assembly that is not separable by the installer or when removed from the door or wall to which ligature-resistant wall-mountable hook 10 is mounted.

Figure 3:
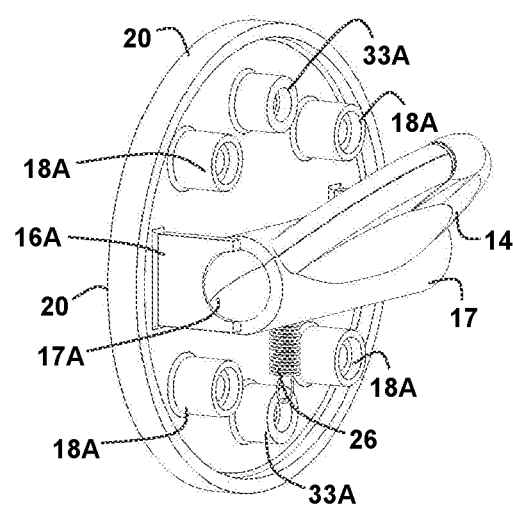
FIG. 3 is a perspective view of the example ligature-resistant wall-mountable hook 10 with a cover 12 removed.

Referring now to FIG. 3, a perspective view of baseplate 20 with spring 26 and rotating tab 14 assembled thereto, is shown. The position of holes 33A and 18A are illustrated, along with the alignment of spring 26, an end of which is looped around a bottom one of one of rivets 33 of cover 12 (not shown) before baseplate 20 is fastened to cover 12 by swaging rivets 33 through holes 33A. Rotating tab 14 is supported on each axle end 17A by a support protrusion 16A, one disposed at each end of cylindrical body portion 17, which have a u-shaped groove in which half of axle ends 17A rest. A corresponding support groove is supplied on the inside back surface of cover (not shown), as will be described below. Guides 47 are provided at the inner back surface of cover 12 for accepting support protrusions 16A and axle ends 17A shown in FIG. 2B.

Figure 4A:
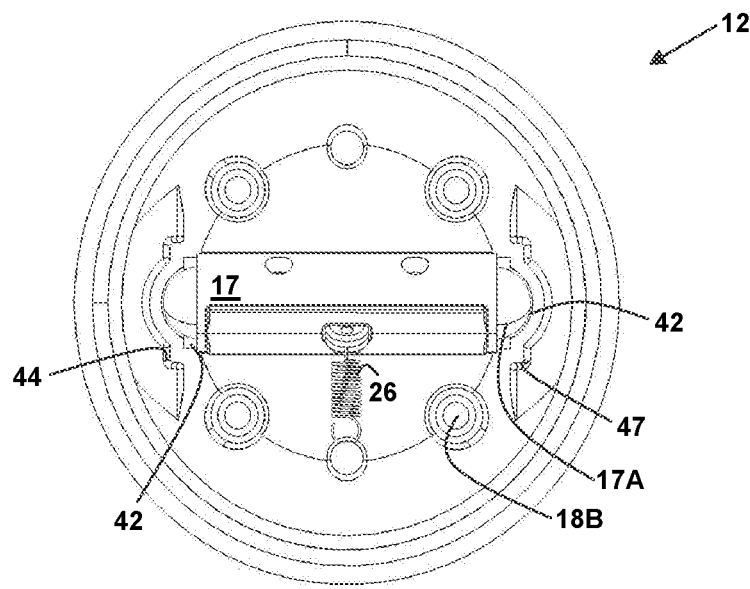
FIG. 4A rear view and FIG. 4B is a front left perspective view of cover 12 of the example wall-mountable wall-mountable hook 10.
Figure 4B:
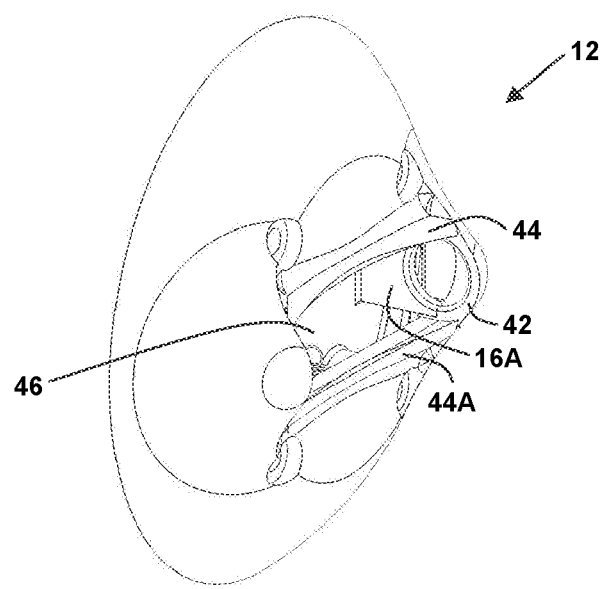

Referring now to FIG. 4A, a rear view of cover 12 is shown. A position of mounting holes 18B is shown, along with cylindrical body portion 17 of rotating tab 14 and spring 26. Support grooves 42 are shown, which contact the tops of support protrusions 16A of baseplate 20 (not shown) to form a circular bearing in which axle ends 17A of rotating tab 14 freely rotate. FIG. 4B shows the alignment of support protrusions 16A with support grooves 42. Also illustrated in FIG. 4B is an outward inclined/curved surface 44, 44A of cover 12 around the edges of an aperture 46 through which rotating tab 14 extends, preventing insertion of objects above and below cylindrical body portion 17 of rotating tab 14 in the final assembly, while permitting rotating tab 14 to rotate without striking cover 12 by removing material from cover 12, in particular near the horizontal midpoint of rotating tab 14 where rotating tab 14 has the greatest projection toward the top and bottom edges of aperture 46.

Figure 5A:
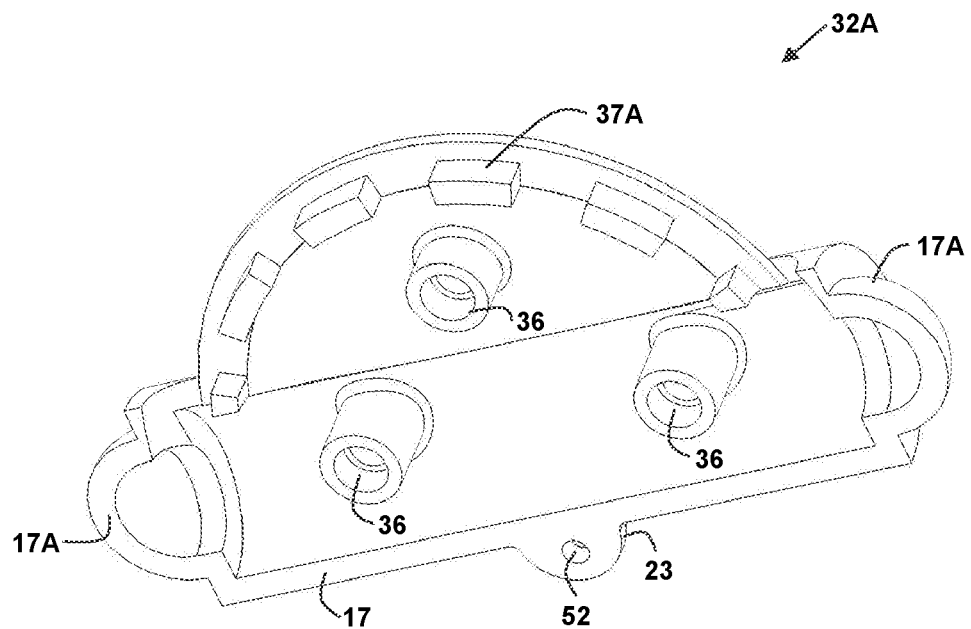
FIG. 5A and FIG. 5B are perspective views of portions of tab 14 of example ligature-resistant wall-mountable hook 10.
Figure 5B:
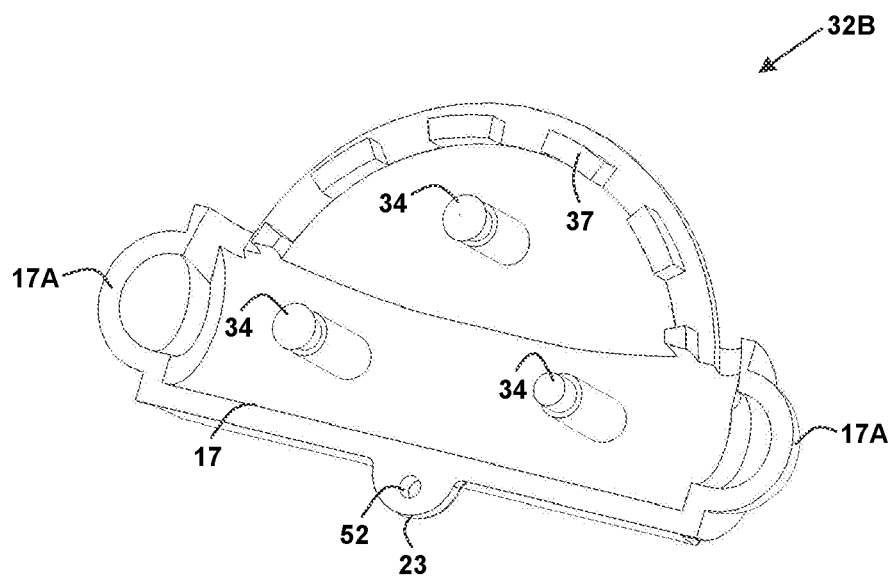

Referring now to FIG. 5A and FIG. 5B, perspective views of top portion 32A and bottom portion 32B of the body of rotating tab 14 are shown. A position of studded holes 36 is shown on top portion 32A, with rivets 34 at corresponding locations on bottom portion 32B. The location of protrusions 37A on top portion 32A and corresponding protrusions 37 on bottom portion are shown, as well as the portion of axle ends 17A on each of top portion 32A and bottom portion 32B. Flange 23 is shown with a hole 52 which have portions provided on each of top portion 32A and bottom portion 32B, and provide for securing an end of spring 26.

Figure 6A:
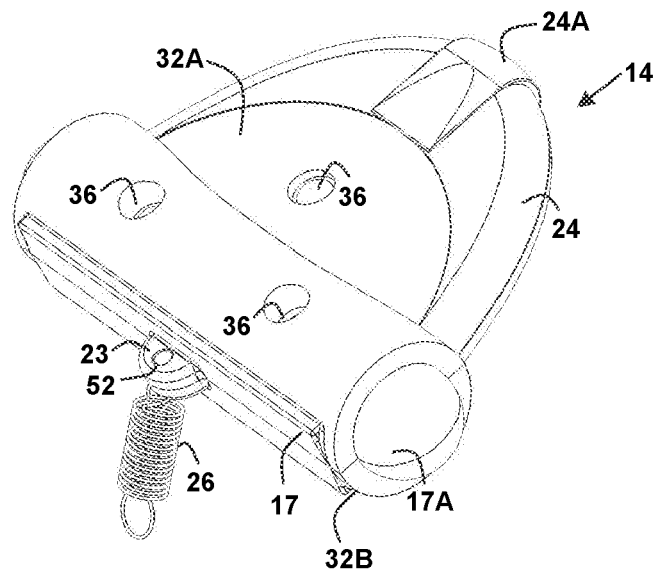
FIG. 6A is an upper right perspective view and FIG. 6B is a lower right perspective view of tab 14 and a spring 26 of example ligature-resistant wall-mountable hook 10.
Figure 6B:
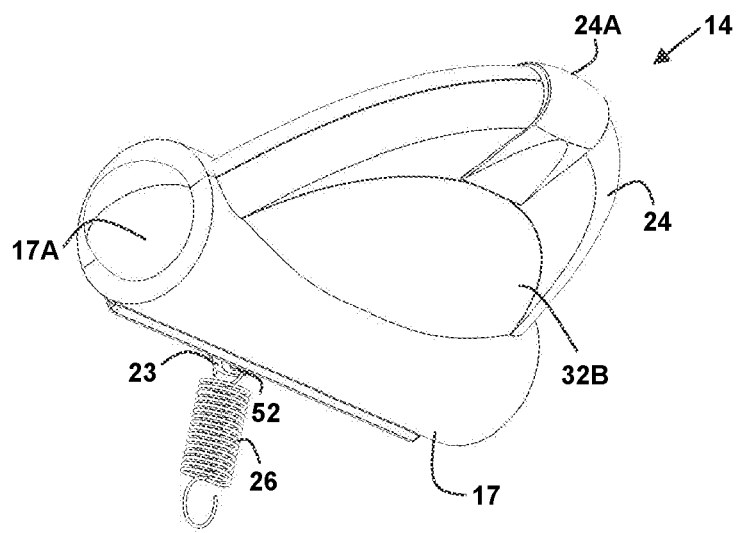

Referring now to FIG. 6A and FIG. 6B, perspective views of assembled rotating tab 14 are shown, with lip 24 secured between top portion 32A and bottom portion 32B and extending rearward to axle ends 17A of cylindrical body portion 17 of rotating tab 14, with spring 26 attached to flange 23 through hole 52. Rubber grip 24A is mounted to lip 24 to improve gripping of objects by lip 24.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A mountable ligature-resistant hook for supporting a personal article from a wall or door, comprising:
   a baseplate having a planar rear surface for attachment to the wall or door;
   a rotating tab rotatably coupled to the baseplate for receiving and retaining the personal article, wherein the rotating tab comprises a cylindrical body portion rotatably coupled to the baseplate and an extension portion that extends through the aperture defined by the cover, wherein the extension portion is mechanically connected to the cylindrical body so that the extension portion rotates in concert with the cylindrical body, wherein the extension portion has a parabolic or semicircular profile extending radially from the cylindrical body portion and rearward toward the cylindrical body from an apex point thereof, whereby the parabolic or semi-circular profile provides contact areas for contacting a strap of the personal article on either side of the rotating tab;
   a restoring-force-providing member for restoring the rotating tab to an upward position, wherein, in the upward position, an extension of the rotating tab away from the baseplate extends upward along a direction at least 30 degrees from a direction perpendicular to the planar rear surface of the baseplate, so that a loop formed around the extension of the rotating tab is held by the extension of the rotating tab unless the weight applied to the loop exceeds a threshold weight dependent on a restoring force characteristic of the restoring-force-providing member; and
   a cover for covering the baseplate and defining an aperture through which the extension projects, wherein an exterior profile of the cover above the aperture at opposing sides of of the aperture extends outward from the baseplate and downward at an angle exceeding 30 degrees from the perpendicular direction, so that a loop formed around the rotating tab and the cover and pulled downward is drawn outward to contact the rotating tab, such that if a weight on the loop exceeds the threshold weight, the rotating tab rotates to release the loop.

2. The ligature-resistant hook of claim 1, wherein the restoring-force-providing member is a spring having a first end mechanically coupled to the rotating tab and a second end mechanically coupled to the baseplate.

3. The ligature-resistant hook of claim 1, wherein the extension portion of the rotating tab comprises:
   a lip providing the parabolic or semicircular profile of the extension portion; and
   a rigid mounting flange extending from the cylindrical body portion of the rotating tab, wherein the lip is separable from the rigid mounting flange.

4. The ligature-resistant hook of claim 3, wherein the extension portion of the rotating tab comprises:
   a bottom portion including a bottom portion of the rigid mounting flange and a bottom half of the cylindrical body portion having a half-circular cross section; and
   a top portion including a top portion of the rigid mounting flange and a top half of the cylindrical body portion having another half-circular cross section complementary to the half-circular cross-section of the bottom half of the cylindrical body, wherein when the bottom portion is secured to the top portion, the cylindrical body is formed by the bottom half and the top half of the cylindrical body portion.

5. The ligature-resistant hook of claim 4, wherein at least one of the top portion of the extension portion of the rotating tab or the bottom portion of the extension portion of the rotating tab includes mating features for securing the lip to the extension portion of the rotating tab, and wherein the lip includes complementary mating features that mate with the mating features of the at least one of the top portion of the extension portion of the rotating tab or the bottom portion of the extension portion of the rotating tab to secure the lip against removal from the extension portion of the rotating tab.

6. The ligature-resistant hook of claim 4, wherein the top portion of the rotating tab and the bottom portion of the rotating tab include fastener portions for securing the top portion of the rotating tab and the bottom portion of the rotating tab.

7. The ligature-resistant hook of claim 1, wherein the cylindrical body portion comprises axle ends that extend from ends of the cylindrical body portion into a pair of support protrusions having a semi-circular profile formed in the baseplate and disposed at each end of the cylindrical body portion to support rotation of the cylindrical body portion, and wherein the exterior profile of the cover projects forward at each end of the cylindrical body portion to cover the axle ends of the cylindrical body portion and further provide the exterior profile that extends outward from the baseplate and downward at the angle exceeding 30 degrees from the perpendicular direction above the aperture.

8. The ligature-resistant hook of claim 7, wherein the cover includes a pair of support grooves disposed at each end of the cylindrical body portion that have a complementary semi-circular profile that contacts the support protrusions of the baseplate to complete a circular retaining profile around corresponding axle ends of the cylindrical body portion of the rotating tab.

9. The ligature-resistant hook of claim 1, wherein the cover has a profile inclined inward toward edges of the aperture above and below the aperture to increase a rotational range of the rotating tab while preventing insertion of objects through the aperture above and below the rotating tab.

10. A mountable ligature-resistant hook for supporting a personal article from a wall or door, comprising:
   a baseplate having a planar rear surface for attachment to the wall or door;
   a rotating tab having a cylindrical body rotatably coupled to the baseplate and an extension portion for receiving and retaining the personal article and mechanically connected to the cylindrical body so that the extension portion rotates in concert with the cylindrical body, wherein the extension portion has a parabolic or semi-circular profile extending radially from the cylindrical body portion and rearward toward the cylindrical body from a apex point thereof, whereby the parabolic or semi-circular profile provides contact areas for contacting a strap of the personal article on either side of the rotating tab, wherein the extension portion has a lip providing the parabolic or semicircular profile of the extension portion, and a rigid mounting flange extending from the cylindrical body portion of the rotating tab, wherein the lip is separable from the rigid mounting flange;

a spring having a first end mechanically coupled to the rotating tab and a second end mechanically coupled to the baseplate for restoring the extension portion of the rotating tab to an upward position, wherein, in the upward position, the extension portion of the rotating tab away from the baseplate extends upward along a direction at least 30 degrees from a direction perpendicular to the planar rear surface of the baseplate, so that a loop formed around the extension portion of the rotating tab is held by the extension portion of the rotating tab unless the weight applied to the loop exceeds a threshold weight dependent on a spring constant of the spring; and a cover for covering the baseplate and defining an aperture through which the extension portion of the rotating tab projects, wherein an exterior profile of the cover above the aperture at opposing sides of the aperture extends outward from the baseplate and downward at an angle exceeding 30 degrees from the perpendicular direction, so that a loop formed around the extension portion of the rotating tab and the cover and pulled downward is drawn outward to contact the rotating tab, such that if a weight on the loop exceeds the threshold weight, the rotating tab rotates to release the loop.

11. The ligature-resistant hook of claim 10, wherein the cylindrical body portion comprises axle ends that extend from ends of the cylindrical body portion into a pair of support protrusions having a semi-circular profile formed in the baseplate and disposed at each end of the cylindrical body portion to support rotation of the cylindrical body portion, and wherein the exterior profile of the cover projects forward at each end of the cylindrical body portion to cover the axle ends of the cylindrical body portion and further provide the exterior profile that extends outward from the baseplate and downward at the angle exceeding 30 degrees from the perpendicular direction above the aperture.

12. The ligature-resistant hook of claim 11, wherein the cover includes a pair of support grooves disposed at each end of the cylindrical body portion that have a complementary semi-circular profile that contacts the support protrusions of the baseplate to complete a circular retaining profile around corresponding axle ends of the cylindrical body portion of the rotating tab.

13. A method of supporting a personal article from a wall or door while preventing formation of a ligature, the method comprising:

mounting a baseplate having a planar rear surface to the wall or door;

providing a rotating tab rotatably coupled to the baseplate for receiving and retaining the personal article, wherein the rotating tab include a cylindrical body portion rotatably coupled to the baseplate and an extension portion providing the extension that extends through the aperture defined by the cover, wherein the rotating rotates the extension portion in concert with the cylindrical body via mechanical connection of the extension portion to the cylindrical body, and wherein the extension portion has a parabolic or semi-circular profile extending radially from the cylindrical body portion and rearward toward the cylindrical body from an apex point thereof, whereby the parabolic or semi-circular profile provides contact areas for contacting a strap of the personal article on either side of the rotating tab;

restoring the rotating tab to an upward position by a restoring-force providing member, wherein, in the upward position, an extension of the tab away from the baseplate extends upward along a direction at least 30 degrees from a direction perpendicular to the planar rear surface of the baseplate, so that a loop formed around the extension of the rotating tab is held by the extension of the tab unless the weight applied to the loop exceeds a threshold weight dependent on a restoring force characteristic of the restoring-force-providing member;

covering the baseplate with a cover defining an aperture through which the extension projects;

directing a loop formed around the rotating tab and the cover and outward to contact the rotating tab via an exterior profile of the cover above the aperture at opposing sides of the aperture that extends outward from the baseplate and downward at an angle exceeding 30 degrees from the perpendicular direction when the loop is pulled downward, so that a loop formed around the extension portion of the rotating tab and the cover and pulled downward is drawn outward to contact the rotating tab; and the rotating tab rotating to release the loop if a weight on the loop exceeds the threshold weight.

14. The method of claim 13, wherein the providing provides a rotating tab with an extension portion of the rotating tab including a lip providing the parabolic or semicircular profile of the extension portion and a rigid mounting flange extending from the cylindrical body portion of the rotating tab, wherein the lip is separable from the rigid mounting flange.

15. The method of claim 14, further comprising assembling the rotating tab from a bottom portion including a bottom portion of the rigid mounting flange and a bottom half of the cylindrical body portion having a half-circular cross section and a top portion including a top portion of the rigid mounting flange and a top half of the cylindrical body portion having another half-circular cross section complementary to the half-circular cross-section of the bottom half of the cylindrical body, wherein when the bottom portion is secured to the top portion, the cylindrical body is formed by the bottom half and the top half of the cylindrical body portion.

16. The method of claim 15, wherein at least one of the top portion of the extension portion of the rotating tab or the bottom portion of the extension portion of the rotating tab includes mating features for securing the lip to the extension portion of the rotating tab, and wherein the lip includes complementary mating features that mate with the mating features of the at least one of the top portion of the extension portion of the rotating tab or the bottom portion of the extension portion of the rotating tab, and wherein the assembling secures the lip against removal from the extension portion of the rotating tab by assembling the lip so that the complementary mating features mate with the mating features of the at least one of the top portion of the extension portion of the rotating tab or the bottom portion of the extension portion of the rotating tab.

17. The method of claim 13, further comprising:

supporting axle ends of the cylindrical body portion with a pair of support protrusions having a semi-circular profile formed in the baseplate and disposed at each end of the cylindrical body portion to support rotation of the cylindrical body portion; and covering the axle ends with the exterior profile of the cover projecting forward at each end of the cylindrical body portion.

18. The method of claim 13, further comprising preventing insertion of objects through the aperture above and below the rotating tab with a profile of the cover that is inclined inward toward edges of the aperture above and below the aperture.

\* \* \* \* \*